United States Patent [19]
Zimmerhackel

[11] Patent Number: 5,730,332
[45] Date of Patent: Mar. 24, 1998

[54] ACTUATOR FOR AN AEROSOL CONTAINER

[76] Inventor: Franz Zimmerhackel, Wickererweg 4, 65795 Hattersheim, Germany

[21] Appl. No.: 557,059

[22] PCT Filed: Dec. 9, 1993

[86] PCT No.: PCT/EP93/03464

§ 371 Date: Mar. 8, 1996

§ 102(e) Date: Mar. 8, 1996

[87] PCT Pub. No.: WO94/27890

PCT Pub. Date: Dec. 8, 1994

[30] Foreign Application Priority Data

May 24, 1993 [WO] WIPO ............... PCT/EP93/01293

[51] Int. Cl.⁶ .................................................. B67D 1/08
[52] U.S. Cl. ..................... 222/148; 222/330; 222/402.1
[58] Field of Search ............................. 222/148, 190, 222/330, 402.1, 402.13, 531; 239/106, 119, 343

[56] References Cited

U.S. PATENT DOCUMENTS

| 3,767,125 | 10/1973 | Gehres et al. | 222/330 X |
| 3,785,528 | 1/1974 | Mandeltort | 222/148 |
| 4,277,004 | 7/1981 | Barlics | 222/330 X |
| 4,978,035 | 12/1990 | Morane et al. | 222/148 X |

FOREIGN PATENT DOCUMENTS

| 0452208 | 10/1991 | European Pat. Off. . |
| 0550409 | 7/1993 | European Pat. Off. . |
| 2588490 | 4/1987 | France . |
| 1326714 | 8/1973 | United Kingdom . |

*Primary Examiner*—Gregory L. Huson
*Attorney, Agent, or Firm*—Kilgannon & Steidl

[57] ABSTRACT

An actuator for an aerosol container, comprising a body forming an inlet, a top surface (16) defining a multitude of discharge slits (20), and a multitude of body passageways (22) to conduct fluid from the inlet to the discharge slits. Each of the body passageways has a pouch shape, including narrower upper (22a) and lower portions (22b) and a wider mid portion (22c). When the actuator is used to dispense foam from an aerosol container, the shape of the body passageways has several advantages. First, that shape helps the foam to expand as it passes outward through the dispenser, and second, after the container has been used to dispense a quantity of foam, the shape of the body passageways helps to draw back into the actuator any excess foam remaining on the outside of the actuator. Preferably, the actuator is formed in a plastic injection molding process, and the body passageways of the actuator are formed into the desired shape as the plastic cools during the molding process.

11 Claims, 5 Drawing Sheets

ACTUATOR FOR AN AEROSOL CONTAINER

BACKGROUND OF THE INVENTION

This invention generally relates to actuators or spouts for pressurized packages commonly referred to as aerosol containers, and more specifically, to such actuators that are particularly well suited to dispense foam from aerosol containers.

Aerosol packages typically comprise a pressurized container that holds a fluid or solution, and a valve unit to dispense the fluid or solution from the container. The valve unit is situated in the neck of container and is opened by finger pressure against an actuator that is disposed at one terminal end of a valve stem. The valve unit has a moveable valve body and an associated hollow valve stem that, upon the application of the above-mentioned finger pressure, unseats from a gasket to permit flow of product into the valve stem and then through and from the actuator.

GB-A-1326714 an actuator for an aerosol container is known, comprising a body forming an inlet to connect the actuator to a discharge outlet of the container, in fluid communication therewith, to receive fluid therefrom, a side surface defining a single discharge opening to discharge fluid from the actuator, and a single body passageway extending between the inlet and the discharge opening to conduct the fluid from the inlet to the discharge opening. The body passageway is surrounded by a thin wall of material and has a narrow outer portion, a narrow inner portion and a wider mid portion.

Many aerosol containers are used to dispense a foam that is used for personal or household purposes, such as mousse. It is known that the texture or quality of foams emerging from pressurized foam containers can be improved by making the foam pass through narrow passageways in the actuators of the containers. Heretofore, typically, in order to provide an actuator with a multitude of such narrow passageways, it has been necessary to make the actuator from two or more pieces that are made separately and then joined or fitted together as described in U.S. Pat. No. 3,767,125. Despite the associated economic advantages, no commercially practical process has been developed for forming a one-piece, integrally molded actuator having a multitude of narrow passageways.

Another disadvantage of prior art foam actuators is that often, after the actuator is used to dispense a quantity of foam, a small amount of that foam remains on the surface of the actuator. Over a period of time, that foam collapses and dries, leaving a sticky residue on the actuator that is both messy and unsightly.

SUMMARY OF THE INVENTION

An object of this invention is to improve actuators for aerosol containers.

Another object of the present invention is to provide an actuator that is able to draw foam back inward, into the actuator, after the actuator has been used to dispense a quantity of foam from an aerosol container.

A further object of this invention is to provide a one-piece, integrally molded actuator for dispensing foam from an aerosol container and having a multitude of narrow passageways that act to improve the texture and quality of the foam dispensed from the container.

Another object of this invention is to form a foam actuator in a plastic injection molding process, and to utilize the natural shrinkage that occurs during the molding process to form pouch-shaped passageways in the actuator that both improve the texture and quality of the foam discharged from the actuator, and also help to draw back into the actuator foam residue from the actuator surface.

These and other objectives are attained with an actuator for an aerosol container, comprising a body forming an inlet, a top surface defining a multitude of discharge slits, and a multitude of body passageways each being joined in a upper massive part of the body to conduct fluid from the inlet to the discharge slits. Each of the body passageways has a pouch shape, including narrower upper and lower portions and a wider mid portion. Preferably, the discharge slits and the body passageways radially extend outward from, and are equally spaced apart around, a central portion of the body. With one embodiment, that central portion comprises a solid stem; and in another embodiment, that central portion forms a conduit that extends between the inlet and the top surface of the body to help discharge foam from the actuator.

When the actuator is used to dispense foam from an aerosol container, the shape of the body passageways has several advantages. First, that shape helps the foam to expand as it passes outward through the actuator; and second, after the container has been used to dispense a quantity of foam, the shape of the body passageways helps to draw back into the actuator any excess foam remaining on the outside of the actuator. Preferably, the actuator is formed in a plastic injection molding process, and the body passageways of the actuator are formed into the desired shape as the plastic cools during the molding process.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
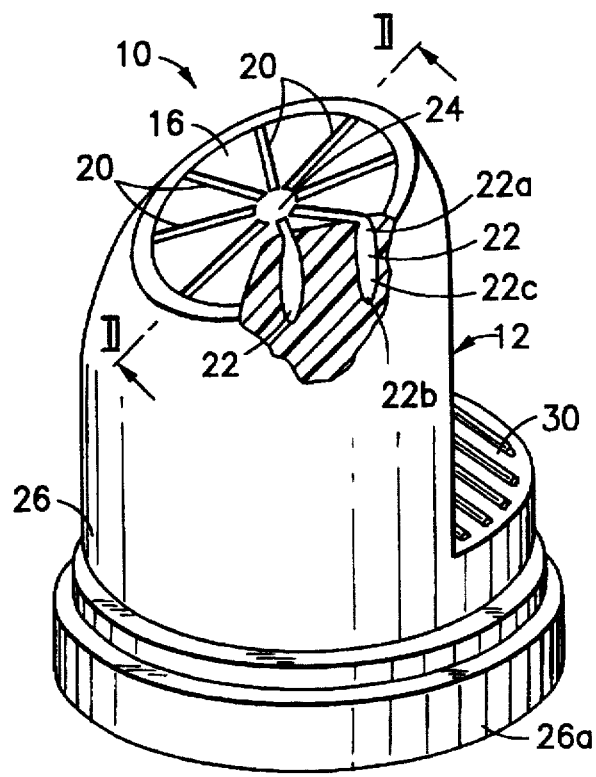
FIG. 1 is a perspective view of an actuator, with portions broken away, embodying the present invention.
Figure 2:
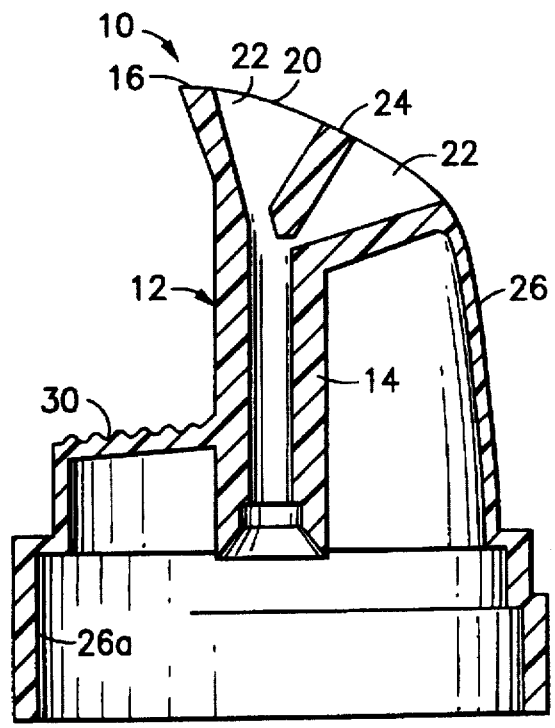
FIG. 2 is a cross-sectional view of the actuator, taken along plane II—II of FIG. 1.
Figure 3:
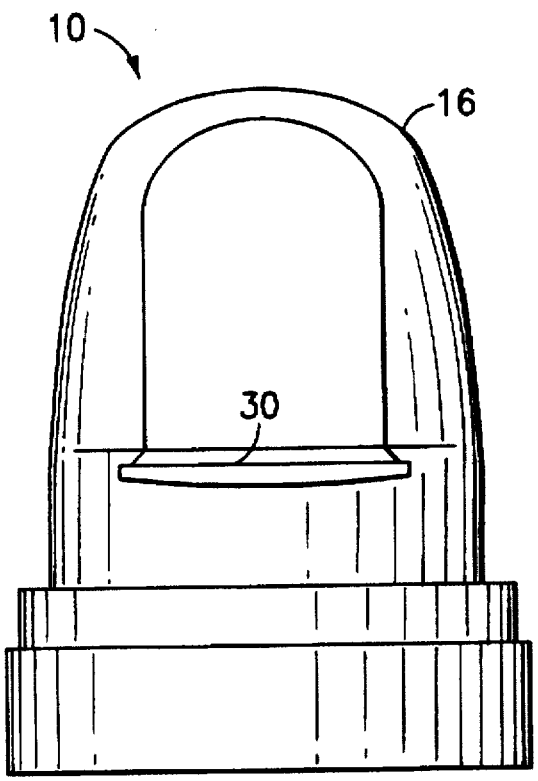
FIG. 3 is a front view of the actuator.
Figure 4:
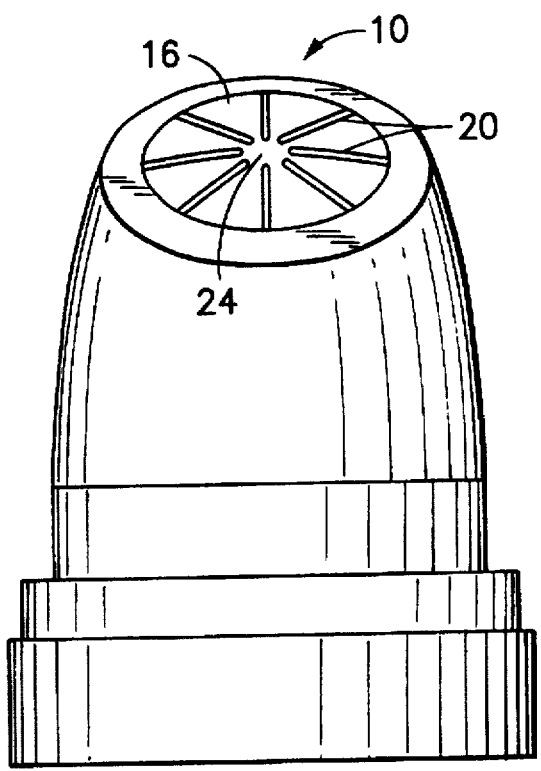
FIG. 4 is a back view of the actuator.
Figure 5:
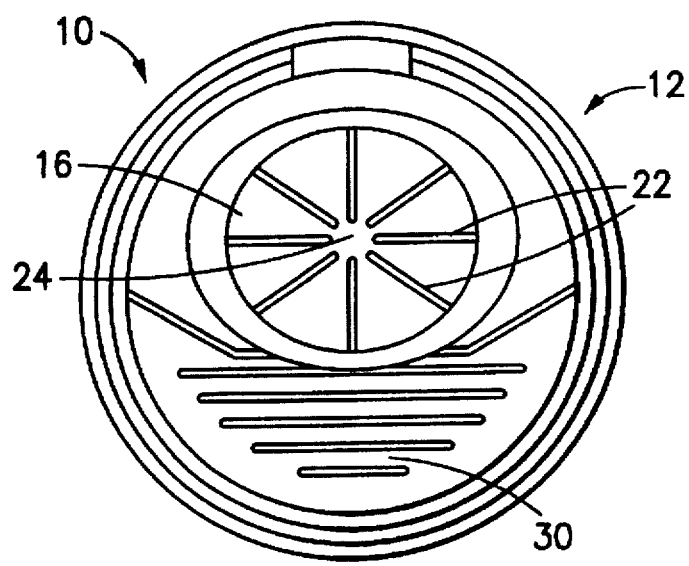
FIG. 5 is a top view of the actuator.

FIGS. 1–5 illustrate an actuator or spray spout, generally designated at 10, for an aerosol container. Actuator 10 comprises body 12 that forms inlet 14, top surface 16 that defines a multitude of elongated discharge slits 20, and a multitude of body passageways 22. Preferably, actuator body 12 also forms central stem 24, outside shell 26 including a lower mounting section 26a, and a finger or actuator surface 30. As discussed below, preferably actuator body 12 is a one-piece body formed in an injection molding process.

Inlet 14 is provided to connect actuator 10 to the valve stem of an aerosol valve, in fluid communication therewith. Each of the body passageways 22 extends between inlet 14 and a respective one of the discharge slits 20 to conduct foam from the body inlet to that discharge slit, through which the fluid is then discharged from the actuator. Shell 26, particularly mounting section 26a, is provided to mount actuator 10 on an aerosol container. Surface 30 provides an area for a user to apply finger pressure to actuator 10 to open the valve stem to which the actuator is connected and thereby dispense fluid through the actuator.

Figure 11:
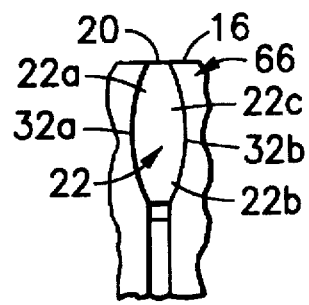
FIG. 11 shows the actuator portion of FIG. 10 after the actuator has cooled.

With particular reference to FIGS. 1 and 11, each passageway 22 of actuator body 12 has a pouch shape, including narrower upper and lower portions 22a and 22b and a wider intermediate or middle portion 22c. More specifically, the upper and lower portions 22a and 22b of each passageway 22 have a width generally equal to the width of the discharge slits 20. The sidewalls 32a and 32b of each passageway 22 extend downwardly and outwardly from the top of the passageway, forming the enlarged central portion 22c of the passageway; and from this central portion, the sidewalls of each passageway extend downwardly and inwardly, narrowing the width of the passageway.

The unique shape of passageways 22 of actuator 10 has several advantages. First, when the actuator is used to dispense foam from an aerosol container, the enlarged portions of the body passageways help that foam to expand, improving the texture and quality of the foam. Second, after the actuator has been used to dispense a quantity of foam, the foam remaining in passageway 22 partially collapses, producing an appreciable vacuum that draws foam back into the passageways from top surface 16 of the actuator. This helps to keep that top surface clean and free of excess foam, eliminating the sticky residue that can be produced by any foam remaining on that surface.

Figure 6:
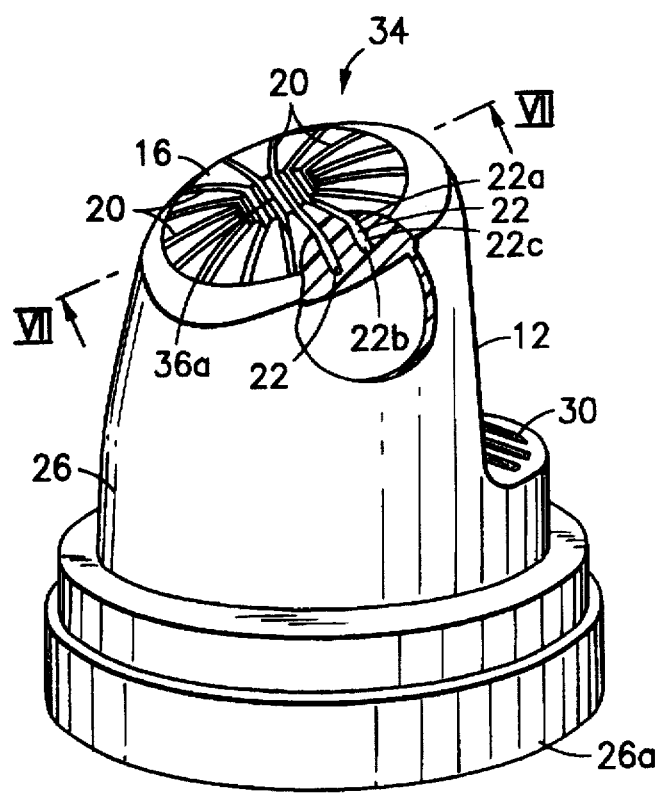
FIG. 6 is a perspective view of an alternate embodiment of the actuator, also with portions broken away.
Figure 7:
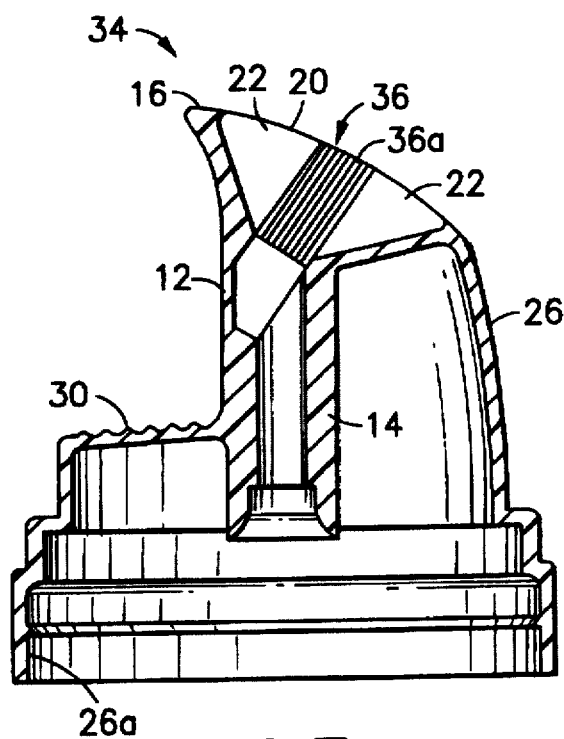
FIG. 7 is a cross-sectional view of the actuator of FIG. 6, taken along plane VII—VII thereof.

FIGS. 6 and 7 show an alternate actuator 34 having a central conduit 36 in place of stem 24. More particularly, actuator 34 is very similar to actuator 10, and like reference numbers are used to identify identical or corresponding elements of the two actuators. Thus, actuator 34 includes body 12 that forms inlet 14, and top surface 16 that defines a multitude of body passageways 22. Preferably, actuator body 12 of actuator 34 also forms outside shell 26 including lower mounting section 26a, and finger or actuator surface 30. Inlet 14, body surface 16, discharge slits 20, body passageways 22, shell 26, and actuator surface 30 of actuator 34 serve the same functions as the corresponding elements of actuator 10. Also, preferably, body passageways 22 of actuator 34 have pouch shapes, including narrower upper and lower portions 22a and 22b and a wider intermediate or middle portion 22c. In addition, body 12 of actuator 34, like body 12 of actuator 10, is preferably a one-piece body formed in an injection molding process.

Actuators 10 and 34 differ, as mentioned above, in that the latter actuator has a central conduit 36, including a top outlet opening 36a, where the former actuator has stem 24. More specifically, in actuator 34, conduit 36 extends between and is in fluid communication with inlet 14 and top outlet 36a, and preferably discharge slits 20 and body passageways 22 extend radially outward from and are in fluid communication with conduit 36.

When actuator 34 is used to discharge product from an aerosol container, the product evenly spreads through all the cavities 22 of the radical slots 20, as well as into the central conduit 36. In this way, conduit 36 facilitates the discharge of foam from actuator 34. That central conduit 36 also helps to draw residue foam back into the actuator. In addition, when used with an aerosol container having a high percentage of propellant or a propellant of high pressure, the central conduit 36 of actuator 34 dramatically reduces the noise level caused by the discharge or spray of product from the aerosol container.

Figure 8:
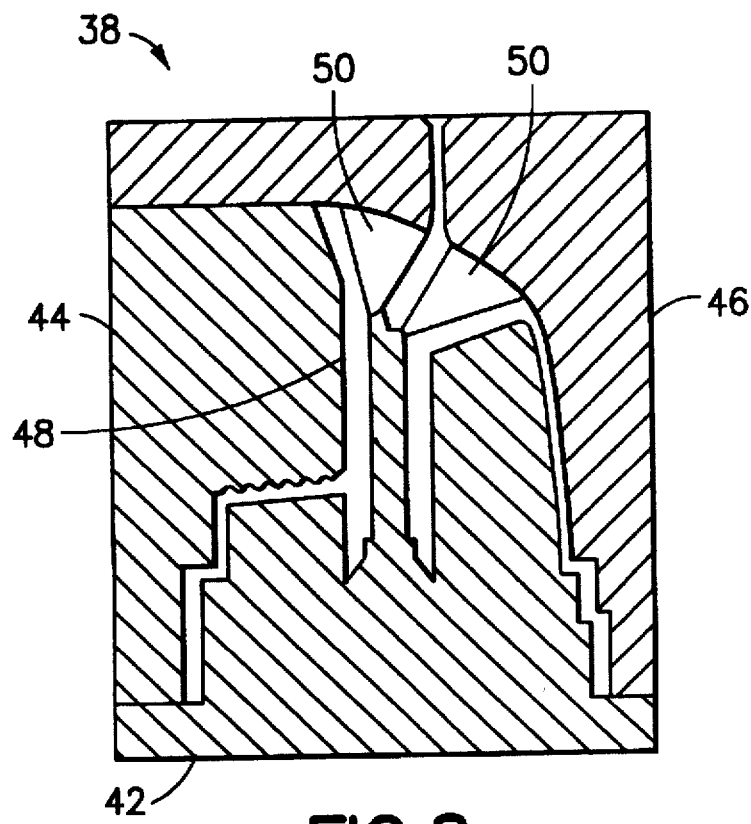
FIG. 8 is a simplified view illustrating a mold for making the actuator shown in FIGS. 1–5.
Figure 9:
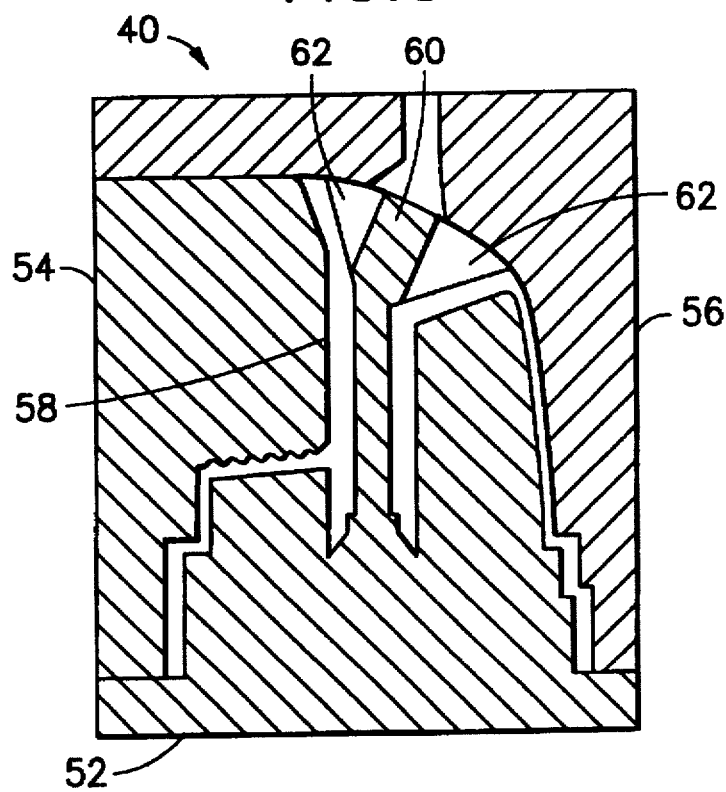
FIG. 9 illustrates a portion of a mold for making the actuator of FIGS. 6 and 7.

Preferably, as previously mentioned, actuators 10 and 34 are formed in injection molding processes and FIGS. 8 and 9 are simplified illustrations of molds 38 and 40 for forming actuators 10 and 34. With reference to FIG. 8, mold 38 includes first, second, and third parts 42, 44, and 46 that, when brought together as shown in FIG. 8, form a recess or cavity 48 substantially having the shape of actuator 10. A multitude of blades 50 or similar means are connected to mold part 46 to form discharge slits 20 and body passageways 22, and these blades may be retractable into mold part 46.

Mold 40 is very similar to mold 38 and includes a plurality of parts 52, 54, and 56 that, when brought together as shown in FIG. 9, form a recess or cavity 58 substantially having the shape of actuator 34. A principal difference between molds 38 and 40 is that the latter mold includes a stem 60 that is used to form central conduit 36 of actuator 34. Mold 40, like mold 38, may include a multitude of retractable blades 62 or similar means connected to mold part 56 to form the discharge slits 20 and the body passageways 22 of actuator 34.

Figure 10:
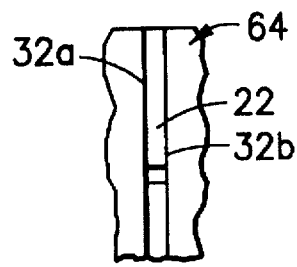
FIG. 10 shows a portion of the actuator formed in the mold of FIG. 8.

To form actuator 10, mold parts 42, 44, and 46 are brought together to form cavity 48, and then a hot molten plastic is injected into the mold cavity to fill that cavity. Similarly, to form actuator 34, mold parts 52, 54, and 56 are brought together to form cavity 58, and a hot molten plastic is injected into that mold cavity to fill the cavity. In both cases, after the cavity is filled with the plastic, the mold is cooled to harden the plastic. As the plastic cools, the upper portions of the actuator body 12 shrink from an initial shape, shown at 64 in FIG. 10, to a final shape, shown at 66 in FIG. 11, thus forming enlarged portions 22c of passageways 22. Once the plastic has sufficiently hardened, the mold is opened and the actuator is removed.

The above-mentioned shrinkage of the plastic material is normally undesirable, and usually efforts are made to prevent or minimize this shrinkage. The present invention employs this normally undesirable effect to actually improve the design and operation of the actuator.

Figure 12:
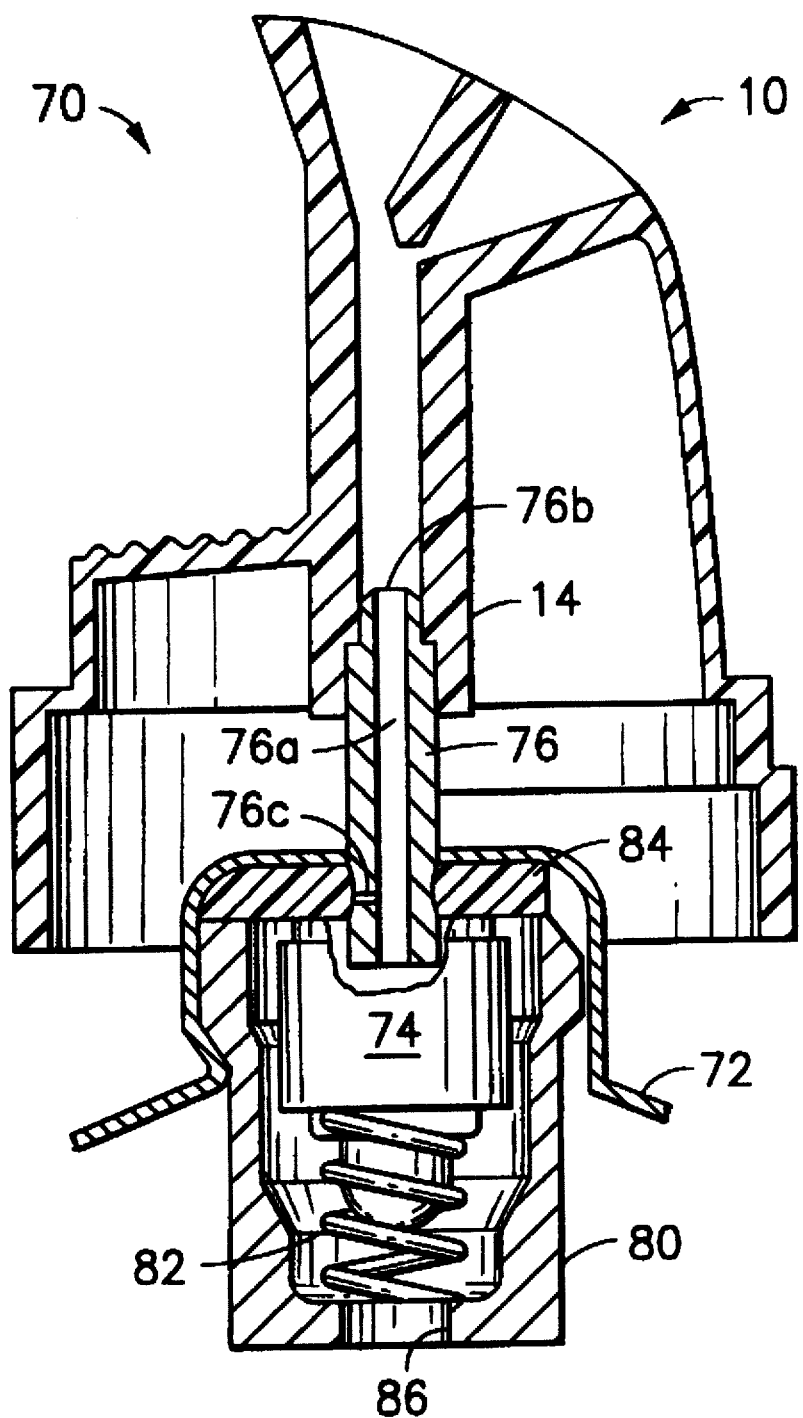
FIG. 12 shows the actuator of FIGS. 1–5 assembled in a valve for an aerosol container.

FIG. 12 shows actuator 10 assembled in an aerosol valve 70, which also includes mounting cup 72, valve body 74, valve stem 76, valve housing 80, spring 82, and gasket 84. The mounting cup 72 is shown partially cut away, and valve housing 80 is crimped to the mounting cup. Gasket 84 is disposed between the top of valve housing 80 and mounting cup and 72 extends around a central, top opening in the mounting cup. Valve stem 76 extends through this top opening and through gasket 84, and the valve stem forms a fluid passageway 76a that extends upward to the valve outlet 76b. The lower sidewall of valve stem 76 forms a through opening 76c that, as shown in FIG. 12, is closed by gasket 84. Valve body 74 is connected to the lower end of valve stem 76, and the valve body is biased upwardly, into engagement with gasket 84, by spring 82, which is disposed between the bottom of the valve body and a surface of valve housing 80. Valve body 74 forms one or more openings that form fluid passageways between the exterior and interior of the valve body.

Aerosol valve 70 is of the type that is designed to be used in an inverted position. In particular, the valve is intended to be mounted on the top of an aerosol container that is inverted to dispense fluid downwardly from the container and through valve 70. For this reason, the bottom of valve housing 80 forms one or more openings 86 to conduct fluid into the valve housing from the associated aerosol container. As will be understood by those of ordinary skill in the art, valve housing 80 may be easily modified for use in an upright position; and specifically, this may be done by providing the valve housing with a conventional inlet, and connecting a conventional dip tube to that inlet to conduct fluid upward into the valve housing from an associated aerosol container.

In use, valve 70 is mounted on an aerosol container and fluid from that container passes into valve housing 80. Normally, valve 70 is in the position shown in FIG. 12, in which gasket 84 closes opening 76c of valve stem 76 and prevents fluid from passing from housing 80 and into the valve stem. To discharge fluid from the aerosol container, actuator 10 is pressed downward (as viewed in FIG. 12), moving valve stem 76 and valve body 74 downward. This moves side opening 76c of valve stem 76 away from gasket 84, allowing the fluid to pass into the valve stem and then through actuator 10, which discharges the fluid.

As will be understood by those of ordinary skill in the art, actuator 34 may be assembled in aerosol valve 70 in a manner substantially identical to the way in which actuator 10 is assembled in that aerosol valve.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

I claim:

1. An actuator for an aerosol container, comprising:
   a body (12) forming
   i) an inlet (14) to connect the actuator (10) to a discharge outlet of the container, in fluid communication therewith, to receive fluid therefrom,
   ii) a top surface (16) defining a multitude of elongated discharge slits (20) to discharge fluid from the actuator, and
   iii) a multitude of body passageways (22) extending between the inlet and a respective one of the discharge slits to conduct the fluid from the inlet to said one of the discharge slits,
   the body passageways each being formed in an upper massive part of the body and each having a narrow upper portion (22a), a narrow lower portion (22b) and a wider mid portion (22c), to allow the fluid to expand as the fluid is conducted outward through the body passageways and to draw back into the body passageways excess fluid from the top surface of the actuator.

2. An actuator according to claim 1, wherein side walls (32a, 32b) of each body passageway (22) gradually taper downwardly outwardly from the upper portion (22a) of the passageway to the mid portion (22c) thereof, and taper downwardly inwardly from the mid portion of the passageway to the lower portion (22b) thereof.

3. An actuator according to claim 2, wherein:
   the top surface (16) of the body (12) has a central stem (24), and
   the multitude of elongated discharge slits (20) radially extend outward from said central stem.

4. An actuator according to claim 3, wherein each of the body passageways (22) extends directly downward from the respective one of the discharge slits (20).

5. An actuator according to claim 4, wherein the discharge slits (20) are uniformly, spaced apart around the stem (24) of the body (12).

6. An actuator according to claim 2, wherein:
   the top surface (16) defines a central top outlet to facilitate the discharge of fluid from the actuator (34);
   the body (12) further forms a central conduit (36) extending between and in fluid communication with the inlet (14) and said central top outlet to conduct the fluid from the inlet to the central top outlet; and
   the multitude of body passageways (22) are disposed around said central conduit.

7. An actuator according to claim 6, wherein the multitude of body passageways (22) are in fluid communication with and radially extend outward from said central conduit (36).

8. An actuator according to claim 2, wherein the body (12) is made of an integrally molded plastic material.

9. An actuator according to claim 8, wherein the mid portions (22c) of the body passageways (22) are enlarged as said plastic material cools and shrinks.

10. An actuator according to claim 1, wherein:
    the body (12) forms a central outlet opening and a central conduit extending between and in fluid communication with the inlet (14) and said central outlet opening to help discharge fluid from the actuator (34), and
    the multitude of body passageways (22) are in fluid communication with and extend outward from said central conduit.

11. An actuator according to claim 10, wherein side walls (32a, 32b) of each body passageway (22) gradually taper downwardly outwardly from the upper portion (22a) of the passageway to the mid portion (22c) thereof, and taper downwardly inwardly from the mid portion of the passageway to the lower portion (22b) thereof.

* * * * *